No. 697,772. Patented Apr. 15, 1902.
C. R. ALLISON.
SAFETY CONTROLLER AND INDICATOR FOR HOISTING ENGINES OR ELEVATORS.
(Application filed July 18, 1901.)
(No Model.) 2 Sheets—Sheet 1.

Witnesses:

Inventor:
Charles R. Allison
by his Attorneys,
Howson & Howson

No. 697,772. Patented Apr. 15, 1902.
C. R. ALLISON.
SAFETY CONTROLLER AND INDICATOR FOR HOISTING ENGINES OR ELEVATORS.
(Application filed July 13, 1901.)
(No Model.) 2 Sheets—Sheet 2.

Witnesses:
Chas. W. Hood.
Hamilton D. Turner

Inventor:
Charles R. Allison
by his Attorneys, Howson & Howson

UNITED STATES PATENT OFFICE.

CHARLES R. ALLISON, OF PORT CARBON, PENNSYLVANIA.

SAFETY CONTROLLER AND INDICATOR FOR HOISTING-ENGINES OR ELEVATORS.

SPECIFICATION forming part of Letters Patent No. 697,772, dated April 15, 1902.

Application filed July 13, 1901. Serial No. 68,154. (No model.)

*To all whom it may concern:*

Be it known that I, CHARLES R. ALLISON, a citizen of the United States, and a resident of Port Carbon, Schuylkill county, Pennsylvania, have invented certain Improvements in Safety Controllers and Indicators for Hoisting-Engines and Elevators, of which the following is a specification.

The object of my invention is to provide an automatic safety controller and indicator for use in connection with hoisting-engines and elevators for the purpose of preventing overwinding and at the same time to indicate the position of the car or cage or other load in the slope or shaft.

My invention is particularly adapted for use with mine hoisting-engines, although it may be employed with all forms of elevating apparatus.

My invention is fully illustrated in the accompanying drawings, in which—

Figure 1:
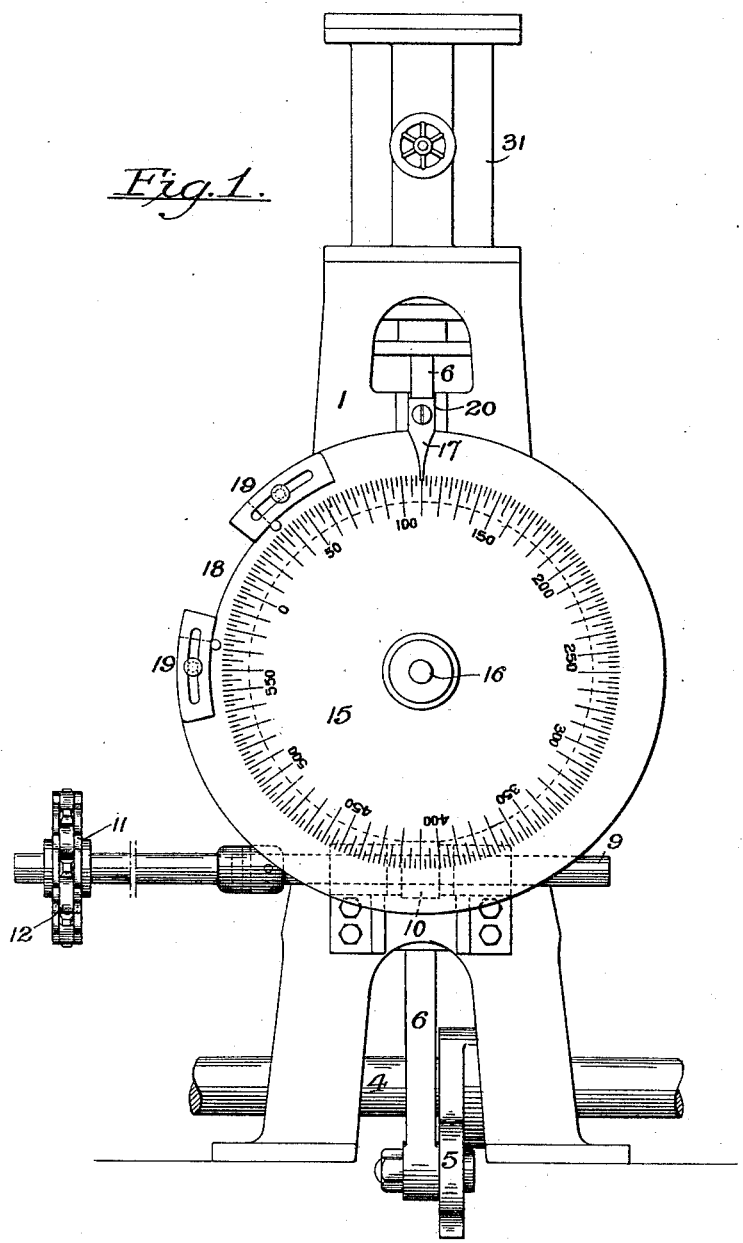
Figure 2:
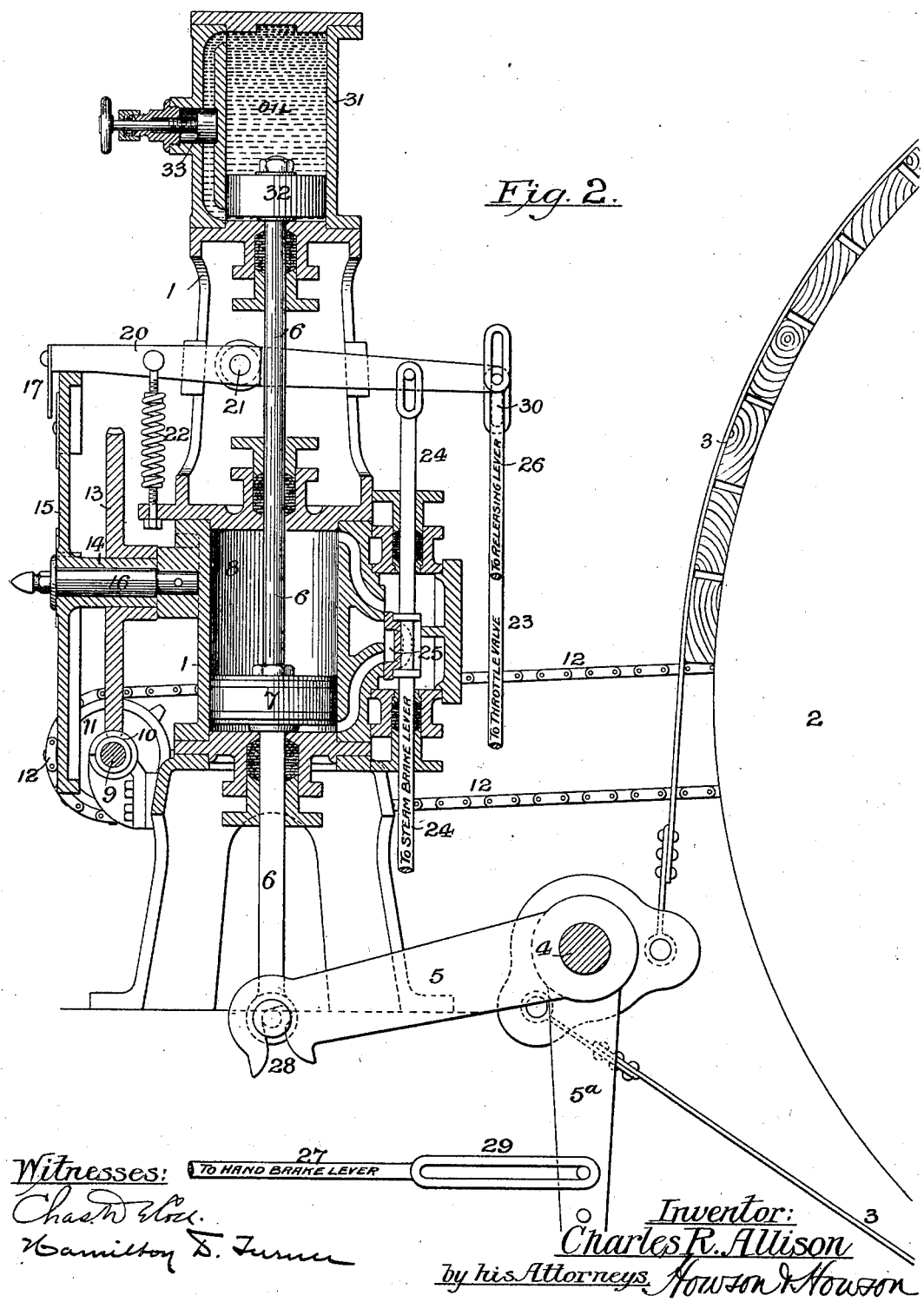

Figure 1 is a front elevation of the mechanism forming the subject of my invention applied to the braking-engine of hoisting apparatus; and Fig. 2 is a sectional view of such engine, showing the connection between the same and the braking mechanism and showing also the mechanism forming the subject of my invention.

In all forms of hoisting-engines of the character to which my invention has been applied, especially when such engines are located at a point remote from the load, there is danger of overwinding from the fact that the operator cannot see the car or cage or other load being hoisted.

The object of my invention is to prevent the overwinding by means of mechanism carried by and operated in conjunction with the auxiliary braking-engine and in full view of the operator, which mechanism will automatically stop the engine at the point of danger, and at the same time the indicator-dial will always show the position of the car or cage or other load in the shaft or slope.

In the drawings herewith, 1 represents the braking-engine, which may be of the usual type and the details of which will be pointed out hereinafter.

2 is the brake-disk, carried at the end of the winding-drum, around which passes the friction band-brake 3, fulcrumed at 4 and controlled by the lever 5, operated by the piston-rod 6, which rod is moved by the piston 7 within the cylinder 8 of the braking-engine.

Mounted on the front of the engine-frame is a shaft 9, suitably journaled and carrying a worm 10, which is driven by means of a sprocket 11, the latter receiving its movement from another sprocket carried by the drum-shaft by means of the chain 12. Meshing with and driven by this worm 10 is the worm-wheel 13, carried by the hub 14 of an indicator-wheel 15, mounted upon a spindle 16, secured to the front of the engine-cylinder. As the winding-drum rotates the worm will be moved with the same, driving the worm-wheel and the dial, and by means of an indicator or pointer 17, fixed with relation to said dial, the position of the car or cage in the slope or shaft will always be known. The indicator dial or disk is notched at 18, and the edges of said notch are provided with adjustable blocks 19, so that the latter may be made any width. The indicator-disk is set so that the edge of the notch 18 will be in a vertical position at the end of the hoist. Should the hoist continue beyond this point, however, from any cause, a tripping-lever 20 is arranged to drop into said notch, open a valve, and permit the flow of steam or other actuating fluid to the cylinder 8, raising the piston 7, and thus throwing on the band-brake 3. This mechanism is as follows: The tripping-lever 20 is pivoted at 21 to the engine-frame and rests normally on the edge of the indicator-dial 15, being held thereto by means of the spring 22, suitably connected to said lever and the engine-frame. The indicator 17 is carried by the end of the tripping-lever 20. At the opposite end of this tripping-lever 20 a connection is made with the throttle-valve rod 23 and the rod 24, to which the steam-brake lever is connected, said rod 24 also controlling the valve 25, which regulates the admission of steam to the cylinder 8 of the braking-engine. Should the hoist overwind, therefore, to such an extent as to cause the indicator-dial to pass beyond its predetermined position, the tripping-lever 20 will be forced into the notch of said dial by the spring 22. This movement of the lever will raise its opposite end, lifting the rod 24, whereby the valve 25 may be opened to admit steam or other motive fluid to the cylinder 8 to raise the piston therein and through the movement of the piston-rod and lever 5 apply the brake. At the same time a rod 23, connecting the tripping-lever with the throttle-valve, will be raised, thereby closing the throttle-valve of the engine. In order to raise the tripping-lever 20, so that the brake 3 may be thrown off, a rod 26 connects said tripping-lever with a releasing-lever under the control of the engineer, and as soon as this has been raised the engineer is permitted to operate the steam-brake lever, which lowers the rod 24 and opens the valve 25, admitting motive fluid to the cylinder 8, pushing the piston 7 to the bottom of said cylinder and causing the parts of the mechanism to assume their normal position, as shown in Fig. 2. The steam-brake may also be operated by raising the rod 24 by means of the steam-brake lever. (Not shown.) The lever 5, by means of which the brake is put on, is provided with another arm 5ª, to which a rod 27 is secured, said rod leading to the hand-brake lever, and the lever 5 is so connected to the piston-rod 6 by means of a hooked end 28, as shown, that when the brake is applied by hand said lever 5 will be raised out of engagement with the piston-rod 6. The rod 27, leading to the hand-brake lever, is slotted at 29, so that its connection with the lever 5ª will not interfere with the braking action when the brake is put on by the moving of the piston 7. The slot 30 in the throttle-valve rod 23 allows the throttle-valve to be opened without interfering with the tripping-lever 20.

For the purpose of regulating the speed at which the brake is applied or released I mount above the cylinder 8 an auxiliary cylinder 31, in which is arranged a piston 32, carried by the upper end of the piston-rod 6. This cylinder is filled with oil or other suitable fluid, which is passed from end to end of the same by the movement of the piston 32, which piston is controlled in such movement by means of the valve 33. By opening this valve slightly the oil or other fluid retards the movement of the piston 32 and the speed of the steam-brake is greatly diminished. By opening the said valve 33 to the full extent, however, the steam-brake is permitted to operate very quickly.

Having thus described my invention, I claim and desire to secure by Letters Patent—

1. The combination in a device of the character described, of the winding-drum, braking means applied thereto, a movable piston for controlling said braking means, an indicating-dial, and means controlled by said dial for throwing the piston into action under certain conditions, substantially as described.

2. The combination in a device of the character described, of the winding-drum, braking means applied thereto, a movable piston adapted to actuate said braking means, a valve for controlling the movement of said piston, an indicator-dial, a tripping-lever controlled by said dial and a connection between said tripping-lever and the valve whereby the latter may be opened when the tripping-lever is released by the dial.

3. The combination in a device of the character described, of the winding-drum, braking means carried thereby, a lever connected to said braking means, a movable piston controlling said lever, an indicator-dial, means for operating said dial in unison with the winding-drum, a tripping-lever supported out of action by the indicator-dial, and a connection between said tripping-lever and the piston-valve whereby the latter may be operated when the tripping-lever is released by the dial.

4. The combination in a device of the character described, of the winding-drum, braking means applied thereto, a movable piston for controlling said braking means, an indicator-dial, means for rotating said dial in unison with the movement of the winding-drum, and a tripping-lever supported out of action by said indicator-dial, said dial having a notched portion into which the lever may fall under certain conditions and when in such position will operate the piston-valve of the braking mechanism and the throttle-valve of the hoisting-engine.

5. The combination in a device of the character described, of the winding-drum of a hoisting-engine, braking means applied thereto, a movable piston for controlling said braking means, a valve controlling the movement of said piston, an indicator-dial controlled and operated in unison with the winding-drum, and a tripping-lever normally held in contact with said dial by means of a suitable spring, said dial having a notch into which the tripping-lever may be pulled under certain conditions, and when in such position operating the piston-valve and the throttle-valve of the engine.

6. The combination in a device of the character described, of the winding-drum of a hoisting-engine, braking means applied thereto, a movable piston for controlling said braking means, a valve controlling the movement of said piston, an indicator-dial controlled and operated in unison with the winding-drum, a tripping-lever normally held in contact with said dial by means of a suitable spring, said dial having a notch into which the tripping-lever may be pulled under certain conditions, and when in such position operating the piston-valve and the throttle-valve of the engine, and means for returning said tripping-lever to its normal position whereby the automatic braking mechanism may be reset, substantially as described.

7. In a device of the character described, a dial for use in connection therewith, a tripping-lever controlled by said dial, said dial having a notch to receive said tripping-lever, and adjustable pieces for regulating the width of said notch.

8. The combination in a device of the character described, of the winding-drum, braking means applied thereto, a movable piston for controlling said braking means, an indicating-dial, means controlled by said dial for throwing the piston into action under certain conditions, and means for retarding the movement of said piston, substantially as described.

In testimony whereof I have signed my name to this specification in the presence of two subscribing witnesses.

CHARLES R. ALLISON.

Witnesses:
WM. U. GANE,
GEORGE W. BULL.